United States Patent [19]

Bunzer

[11] 4,019,828
[45] Apr. 26, 1977

[54] WIND DRIVEN APPARATUS
[76] Inventor: George J. Bunzer, 54 Crown Point, Nokomis, Fla. 33555
[22] Filed: Nov. 1, 1974
[21] Appl. No.: 519,805
[52] U.S. Cl. .................... 415/122 R; 415/202; 290/55; 415/151; 415/203; 416/197 A
[51] Int. Cl.$^2$ .................... F03D 7/06; F03D 3/04
[58] Field of Search ...... 415/2, 121 R, 183, 121 G, 415/202, 3, 4, 12, 122 R, 151, 203; 290/44, 55; 180/65; 416/188, 197 A

[56] References Cited
UNITED STATES PATENTS

| | | | |
|---|---|---|---|
| 196,448 | 10/1877 | Harris | 416/197 |
| 1,002,833 | 9/1911 | Giddings | 415/2 |
| 1,345,022 | 6/1920 | Oliver | 290/55 X |
| 1,415,645 | 5/1922 | Holterud | 290/55 X |
| 1,915,689 | 6/1933 | Moore | 290/55 |
| 2,979,305 | 4/1961 | Kwiatek | 415/143 |
| 3,513,326 | 5/1970 | Potts | 290/55 |
| 3,621,930 | 11/1971 | Dutchak | 290/55 X |
| 3,810,712 | 5/1974 | Hillman | 415/2 |

FOREIGN PATENTS OR APPLICATIONS

| | | | |
|---|---|---|---|
| 187,872 | 12/1956 | Austria | 415/2 |
| 891,026 | 4/1942 | France | 180/65 R |
| 594,330 | 1/1959 | Italy | 415/202 |
| 749,327 | 5/1956 | United Kingdom | 416/91 |

Primary Examiner—Alan Cohan
Assistant Examiner—Gerald A. Michalsky
Attorney, Agent, or Firm—Robert F. Ruemeli

[57] ABSTRACT

Wind driven apparatus is disclosed in the form of a windmill, and in the form of an electric generating unit for a vehicle such as a boat or an airplane or the illustrated automobile. The apparatus includes a base mounted for rotation, preferably about a vertical axis, and along its periphery carrying a series of cones each with an open mouth for receiving air or other fluid, to rotate the base about its axis. The apex of the base deflects the air as the apex moves into the direction of flow of the air. A partition secured across the cone inwardly of the mouth limits the amount of fluid received in the mouth and prevents passage of the fluid to the apex of the cone. When installed as a windmill, the base is horizontally mounted atop a column or other support and is drivingly connected with a pump or electric generator, or other suitable apparatus. As an electric generating unit for a vehicle the base is mounted within a housing having an air scoop for directing the air into the mouths of the cones as they are rotated past the inlet and the base is fixed to an axial shaft connected through a speed regulating mechanism for driving an electric generator connected with batteries or other equipment. An adjustable baffle is provided for limiting the flow of air into the scoop, and for closing the scoop to the passage of air, if desired.

9 Claims, 8 Drawing Figures

WIND DRIVEN APPARATUS

This invention relates to wind driven apparatus and, more particularly, to such apparatus for use as a windmill or an electric generating assembly for a vehicle, or the like.

BACKGROUND OF THE INVENTION

Numerous fluid driven apparatuses are well known in the art, such as typical windmills which have been in use for many years and have been highly developed. Fluid driven devices for vehicles are not so well known and those that have been developed are generally used for generating electricity. Such mechanisims are usually air driven, although air or water driven devices are suitable boats, and numerous forms of water driven devices are well known in the hydroelectric generating field.

A rather novel windmill having blades at a cone base which is rotatably mounted about a horizontal axis, is shown in a patent to Worthmann, U.S. Pat. No. 3,228,475. The wind wheel of this patent is also shown in conjunction with an electric generator for an automobile.

A relatively old patent U.S. Pat. No. 1,903,307, shows a wind driven generator adapted to be mounted on a vehicle, and having a plurality of air scoops discharging against a wind wheel rotating about a horizontal axis. Another air driven electric generator for vehicles is shown in U.S. Pat. No. 2,941,613, has blades extending generally axially of the flow of the air and is mounted on a shaft which also carries an electric generator. Other air driven generators for vehicles are shown in U.S. Pat. No. 3,713,503, and U.S. Pat. No. 3,374,849, the first of these patents having a plurality of generators which may be selectively operated depending on the force of the wind. Finally, U.S. Pat. No. 3,621,930, shows a wind driven generating assembly mounted atop an automobile and having a ventrishaped air intake for driving pairs of propellers, each pair connected with an electric generator. The wind driven members of these patents rotate about horizontal axes so that considerable height is required for accommodating the wind driven member.

SUMMARY OF THE INVENTION

The invention, in brief, is directed to a fluid driven assembly having a rotating base carrying a plurality of members each with a face adapted to receive the fluid, and more particularly wind for propelling the base, each member having an end portion converging from the face for deflecting the fluid as the converging end moves into the flow of the fluid. The face is in the form of a mouth for retaining the fluid with a partition inwardly of each mouth limiting the quantity of fluid received in the mouth and thus facilitates passages of the fluid out of the mouth as the mouth moves out of the flow of the fluid. The base is adapted to be mounted in a horizontal position for rotation about a generally vertical axis and thus may be of relatively low height. In one embodiment the apparatus is in the form of a windmill, and in a second embodiment in a form of an electric generating unit for a vehicle, illustrated in the form of an automobile with a housing on its roof containing the base which is driven by air entering through an air scoop generally facially opposed to the mouths as they pass the scoop outlet. The base is fixed to a shaft which is connected to an electric generator through a speed regulating mechanisim.

It is primary object of this invention to provide a new and useful wind driven apparatus.

Another object is provision of a new and useful fluid, and more particularly wind driven apparatus having a rotatably mounted base with a plurality of members mounted on the base and in series about the axis, each member having a fluid receiving face, preferably in the form of a mouth and, extending rearwardly from the mouth, a portion for deflecting the fluid as the mouth moves out of the flow of the fluid, with a partition inwardly of the mouth for limiting the quantity of propelling fluid, and more particularly wind which may be received by the mouth and also substantially preventing the flow of the fluid past the partition. A related object is provision of the outer most portion of the mouth being flared contra the direction of rotation of the base. Another related object is provision of the apparatus in the form of a windmill and in which the base is horizontally disposed and mounted for rotation about a vertical axis. A further related object is provision of the apparatus in the form of an electric generating unit for a vehicle, the assembly including a housing and the base being horizontally mounted within the housing for rotation about a generally vertical axis, with a scoop having an outlet offset from the axis and facially opposed to the mouths as they are rotated past the outlet, and with an adjustable baffle for regulating the flow of fluid through the scoop.

These and other objects and advantages of the invention will be apparent from the following descripion and the accompanying drawing.

DESCRIPTION OF THE ILLUSTRATED EMBODIMENTS

Figure 1:
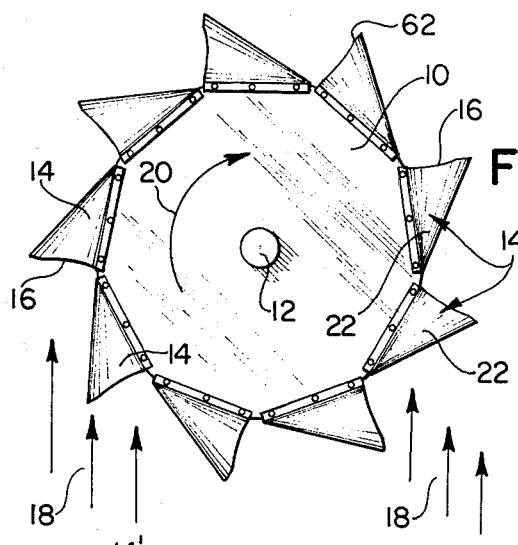
FIG. 1 is a top view of a preferred embodiment of the fluid driven apparatus of this invention, mounted for rotation about a generally vertical axis.

Referring first to FIG. 1 of drawing, the fluid driven apparatus includes a base 10 fixed to a shaft 12 for rotation about a generally vertical axis. A plurality of fluid and more particularly wind responsive members 14 are mounted on the periphery of the base 10 in a series generally concentric with the rotational axis of the device. Each member 14 has a face, preferably in the form of a mouth 16 (FIG. 6) for receiving fluid flowing in the direction of the arrows 18, for rotating the base 10 in the direction of the arrow 20. Each member 14 has a deflecting end 22 opposite the mouth 16 for deflecting the fluid away from the member as the deflecting end 22 moves into the direction of flow of the fluid. Thus, the mouths 16 face in a direction contra the rotational direction of the base 10. The fluid driven device will be more fully described hereinafter with reference to FIG. 6–8.

Figure 2:
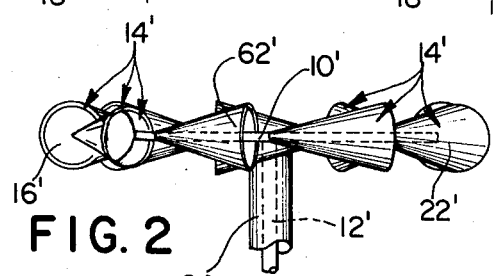
FIG. 2 is a fragmentary, elevational view of the apparatus in the form of a windmill.

A windmill is shown in FIG. 2 wherein the reference numerals primed, as 10', indicate similar or identical parts to those indicated by the unprimed reference numerals in FIG. 1. As shown in FIG. 2, the base 10' is fixed to the shaft 12' suitably journaled (not shown) in a support illustrated in the form of a hollow column 24 mounting the base 10 horizontally disposed for rotation about a vertical axis defined by the shaft 12'. If desired, a plurality of the bases 10' may be positioned, one above the other, for rotation with a common shaft 12', or they may each be mounted on separate concentric shafts for selective rotation independently of each other.

Figure 6:
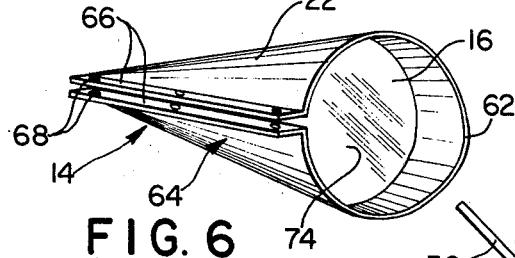
FIG. 6 is an enlarged, perspective view of part of the fluid, and more particularly wind driven apparatus shown in FIGS. 1, 2, 4 and 5, but shown separately.
Figure 3:
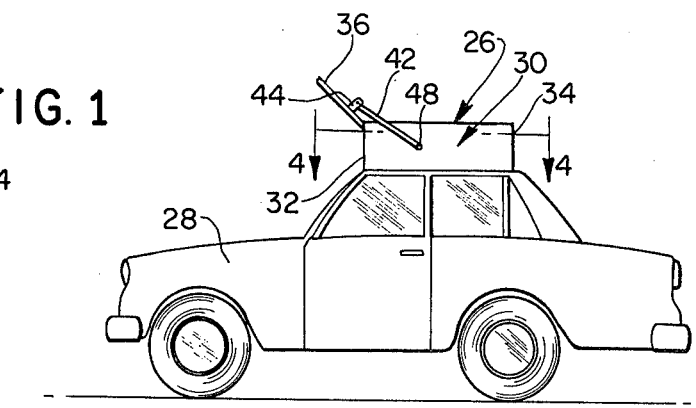
FIG. 3 is an elevational view of another embodiment of the apparatus in the form of an electric generating unit for a vehicle; illustrated in the form of an automobile.
Figure 4:
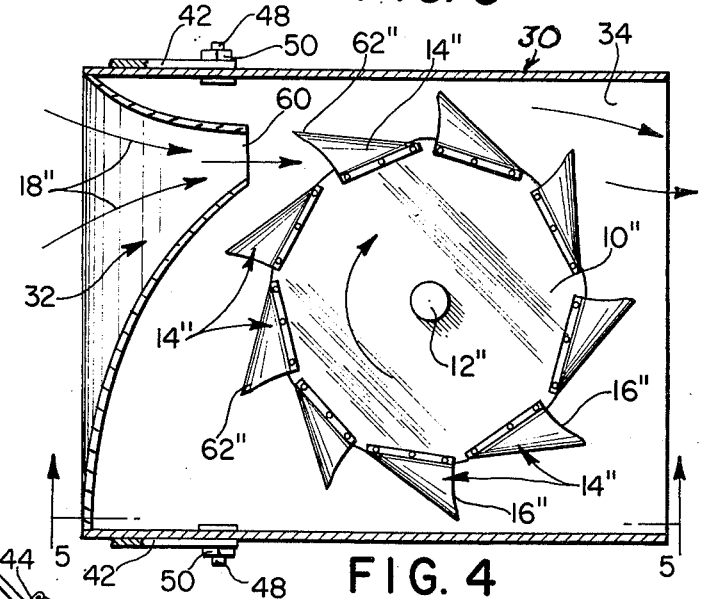
FIG. 4 is an enlarged, sectional top view taken generally along the line 4—4 in FIG. 3.
Figure 5:
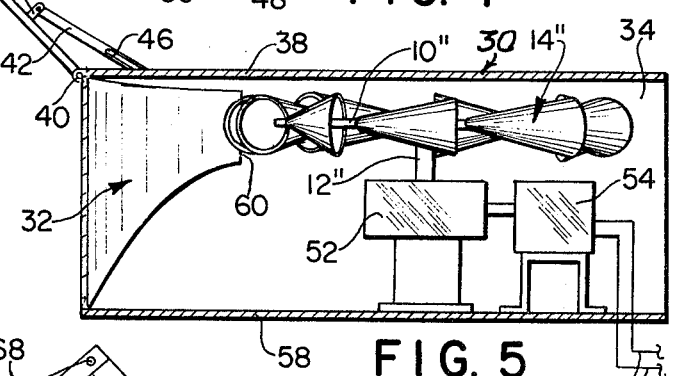
FIG. 5 is a sectional elevational view taken generally along the line 5—5 in FIG. 4.

With reference to the embodiment shown in FIGS. 3–5, reference numerals double primed, as 10", refer to similar or identical parts as those indicated by the unprimed reference numerals in FIGS. 1 and 6. As shown in FIG. 3, an electric generating unit 26 is mounted on the roof of an automobile 28. Unit 26 includes a rectangular housing 30 suitably secured (not shown) to the automobile 28 and having an air inlet 32 (FIGS. 4 and 5) at its front end, and an open rear end 34 (FIGS. 4 and 5) for free discharge of the air. A baffle 36 is adjustably mounted on the front end of the housing for regulating the flow of air through the inlet 32, and for closing the inlet to the flow of air, if desired. As shown in FIG. 5, the baffle 36 is mounted on a top wall 38 of the housing 30 by means of a hinge 40 (FIG. 5) and is retained in adjusted position by a pair of links 42 each pivotally connected at their front ends to fingers 44 secured to the baffle 36, and at their rear ends having elongated slots 46 (FIG. 5) for receiving a shank 48 (FIG. 4) secured to the housing sides. The shanks may be threaded for receiving nuts 50 to secure the links 42, and therefore the baffle 36, in adjusted position.

With continuing reference to FIGS. 4 and 5, the base 10" is fixed to a shaft 12" journaled on a gear box 52 and connected through a suitable speed regulating gearing with an electric generator 54 for delivering electricity through conductors 56 to batteries or other electrical storage or utilization means. The gear box 52 and generator 54 are suitably mounted on a bottom wall 58 of the housing 30.

Inlet 32 is in the form of an air scoop open across the open front face of the housing 30 and converging to an air outlet 60 vertically offset from the shaft 12" for discharging the air at high velocity in to the mouths 16" of the members 14" as the mouths are rotated in front of the outlet 60. As may best be seen in FIGS. 6 and 7, the outer most portion of each mouth is flared, as at 62, in a direction contra to direction of rotation of the base so that the mouths 16" in FIGS. 4 and 5 are exposed to the onrushing air from outlet 60 slightly earlier in their rotation toward the outlet, and so that the mouths receive a greater quantity of air earlier than without the flare.

Figure 7:
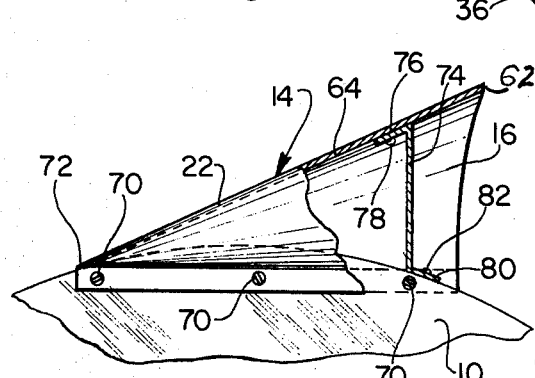
FIG. 7 is an enlarged, fragmentary top view of the part shown in FIG. 6, but mounted on the remainder of the fluid driven apparatus, with parts broken away and removed for clearer illustration.
Figure 8:
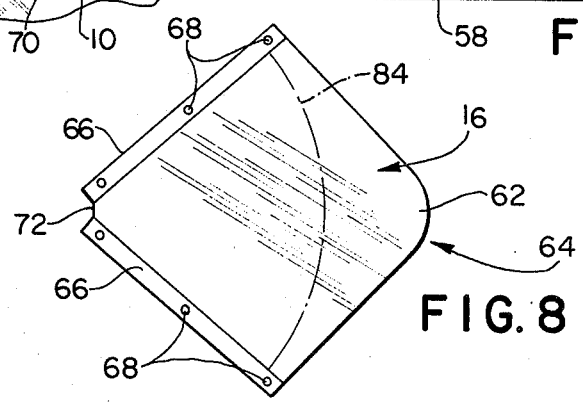
FIG. 8 is a developed view of a portion of the part shown in FIG. 6.

As shown in FIGS. 6 and 7, the members 14 have a generally conical outer shell 64 (shown in a developed view in FIG. 8). The conical shell 64 includes the flare 62 and diametrically opposite to the flare 62, a pair of parallel flanges 66 having aligned apertures, as 68 (FIGS. 6 and 8), receiving bolts 70 (FIG. 7) for securing the shell to the periphery of the base 10. The deflecting portion 22 of the member 14 is defined by the generally conical shell which preferably has its apex 72 in abutting engagement with the periphery of the base 10 to prevent the passage of fluid between the apex and the base. A partition 74 is secured to the shell 64 for limiting the quantity of fluid received in the mouth 16 and for preventing passage of the fluid past the partition and into the apex portion of the shell 64. As herein illustrated, the partition 74 has a flange 76 (FIG. 7) suitably fixed to the shell 64, as by a rivit 78, and a second flange 80 suitably secured to along the peripheral edge of the base 10, as by screw 82. A phantom line 84 in FIG. 8 indicates the general position of the partition 74 with relationship to the mouth 16 and its flare 62.

While this invention has been illustrated and described with reference to particular embodiments in particular enviornments, various changes may be apparent to one skilled in the art, for example any desired number of the members 14 may be mounted on the periphery of the base 10 other than the nine members shown in the drawings, and while the base 10 and the members 14 are preferably mounted for rotation about a generally vertical axis, they may be mounted on a horizontal axis or an inclined axis, and the invention is therefore not to be limited to such embodiments or enviornments except as set forth in the appended claims.

What is claimed is:

1. Wind driven apparatus comprising, a base, means mounting said base for rotation about an axis, means responsive to the flow of wind past the base for rotating the base about said axis, said means including a plurality of wind receiving members operatively associated with the base and each having a mouth for receiving the wind passing the apparatus and responsive thereto rotating the base about said axis, and each member having a closed end opposite said mouth and converging from said mouth toward said end for deflecting the wind about the member, each member further including means spaced slightly inwardly of the outer periphery of the mouth and defining an inner portion of the mouth and substantially preventing passage of wind from said mouth into said end portion, said members being mounted on said base in a spaced apart series about said axis with the mouth of each member spaced from the end of the adjacent member and facing in a generally contrarotational direction of said base with the mouth substantially unobstructed by the adjacent end as the mouth moves into the path of the wind; and the converging ends directed in the rotational direction of said base.

2. Apparatus as set forth in claim 1 in which said members are generally conical and each including one said mouth at the base thereof and the apex being at said end.

3. Apparatus as set forth in claim 2 in which the radially outermost portion of each cone mouth is flared in the contrarotational direction of the base.

4. Apparatus as set forth in claim 3 in which each cone includes flange means securing the cone to the base.

5. Apparatus as set forth in claim 3 in which said axis is generally vertical.

6. Apparatus as set forth in claim 5 in the form of a windmill including a generally vertical support, and said base is generally horizontal and is mounted on said support for rotation about said axis.

7. Apparatus as set forth in claim 5 in the form of an electric generator unit for a vehicle, the unit including a housing having wind inlet means, said base being mounted within the housing with mouths of the cones facing the inlet means as the mouths are rotated past the inlet, a shaft concentric with said axis and secured to said base, and means drivingly connecting the shaft with an electric generator.

8. A unit as set forth in claim 7 in which said inlet means is in the form of a scoop converging to an outlet radially offset from said shaft and positioned for directing the wind into the mouth of each cone as the cone is rotated past the outlet.

9. A unit as set forth in claim 8 in which said inlet means includes an adjustable baffle for regulating the flow of wind therethrough, and the means connecting the shaft and the generator including means regulating the speed at which the generator is driven by the shaft.

* * * * *